United States Patent [19]
Koka et al.

[11] Patent Number: 5,701,728
[45] Date of Patent: Dec. 30, 1997

[54] LAWN MOWER WITH LINE TRIMMER ASSEMBLY

[76] Inventors: George Koka, 7858 Lake Dr., Fair Haven, Mich. 48001; Randy Reed, P.O. Box 230292, Fair Haven, Mich. 48023

[21] Appl. No.: 525,307

[22] Filed: Sep. 8, 1995

[51] Int. Cl.$^6$ .................................................. A01D 55/18
[52] U.S. Cl. .................... 56/12.7; 56/13.7; 56/295
[58] Field of Search ................ 30/276, 347; 56/12.7, 56/17.5, 255, 295, 17.2, 16.7, DIG. 17, DIG. 20, 13.7, 13.8, 16.9

[56] References Cited

U.S. PATENT DOCUMENTS

| | | | |
|---|---|---|---|
| 4,089,114 | 5/1978 | Doolittle et al. | 56/12.7 X |
| 4,199,926 | 4/1980 | Petty . | |
| 4,201,034 | 5/1980 | Frantello | 56/295 |
| 4,374,465 | 2/1983 | Comer | 56/12.7 |
| 4,513,563 | 4/1985 | Roser et al. . | |
| 4,726,176 | 2/1988 | McGrew . | |
| 4,924,665 | 5/1990 | Crosley | 56/12.7 X |
| 4,936,884 | 6/1990 | Campbell . | |
| 4,962,630 | 10/1990 | Jones . | |
| 4,962,635 | 10/1990 | Jones et al. | 56/12.7 |

*Primary Examiner*—Terry Lee Melius
*Assistant Examiner*—Robert Pezzuto
*Attorney, Agent, or Firm*—Brooks & Kushman P.C.

[57] ABSTRACT

A lawn mower includes a housing having a top wall portion and a generally vertically extending side wall portion. A plurality of wheels attached to the housing to allow the housing to roll over a surface to be mowed. An engine mounted atop the housing rotatably drives a shaft extending through the housing. An elongate blade attached to and rotatable with the shaft has a central portion and a pair of end portions, with at least one of the end portions including a cutting edge for cutting vegetation disposed inside of the housing to a first length upon rotation of the blade. A pair of line trimmer assemblies are attached to the blade to provide a pair of filament lines which extend radially outside of the housing to cut vegetation disposed outside of the housing to a second length upon rotation of the blade.

13 Claims, 2 Drawing Sheets

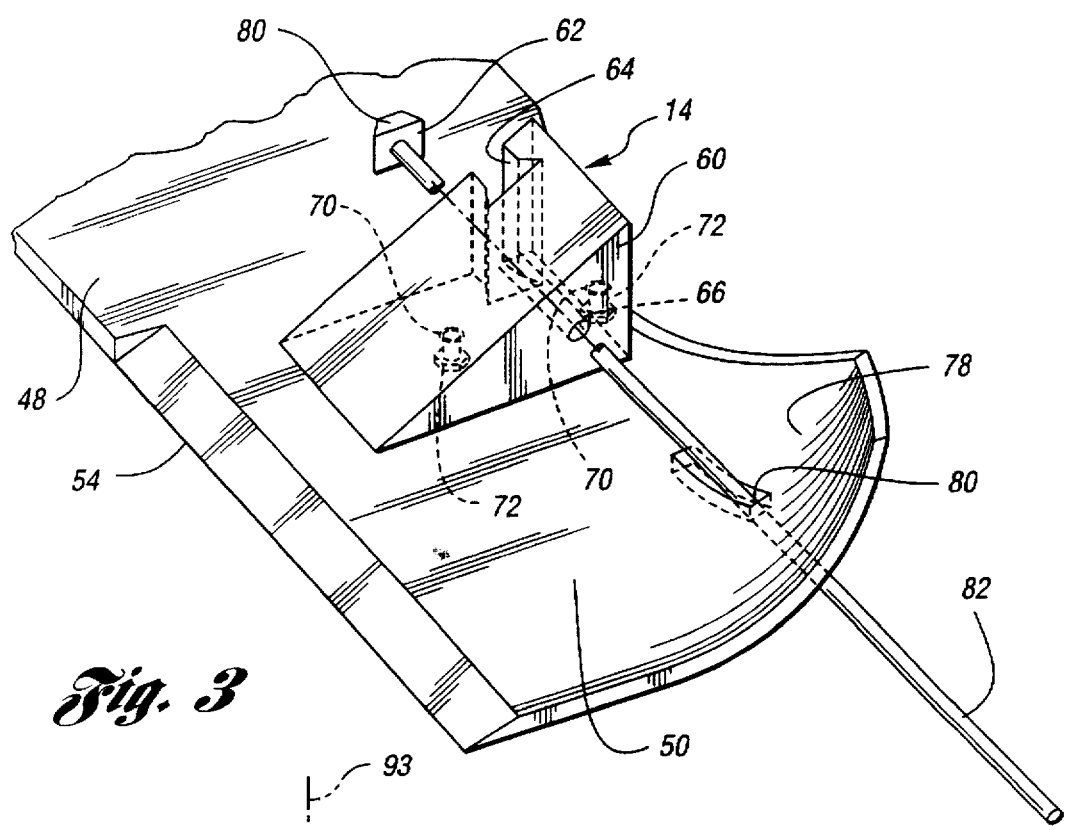
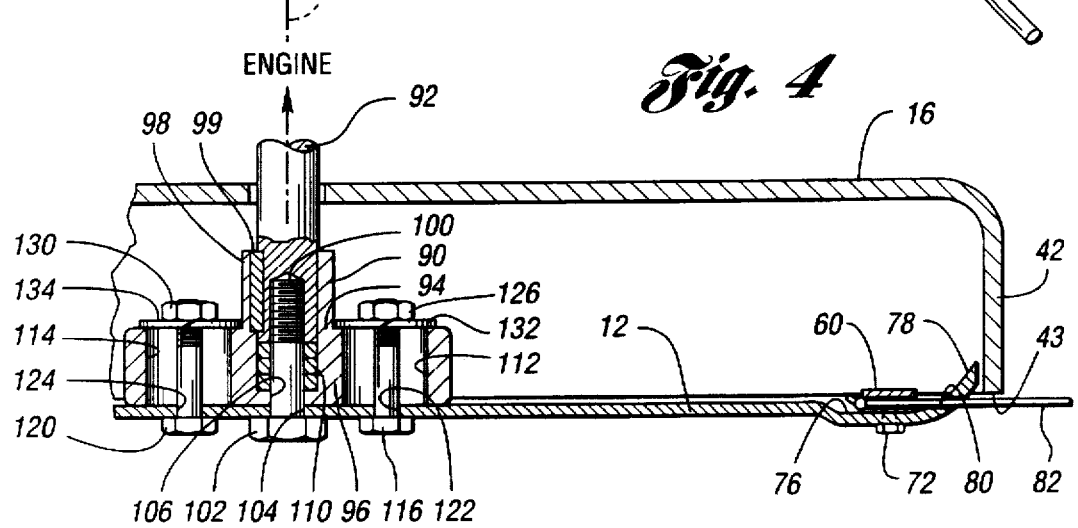
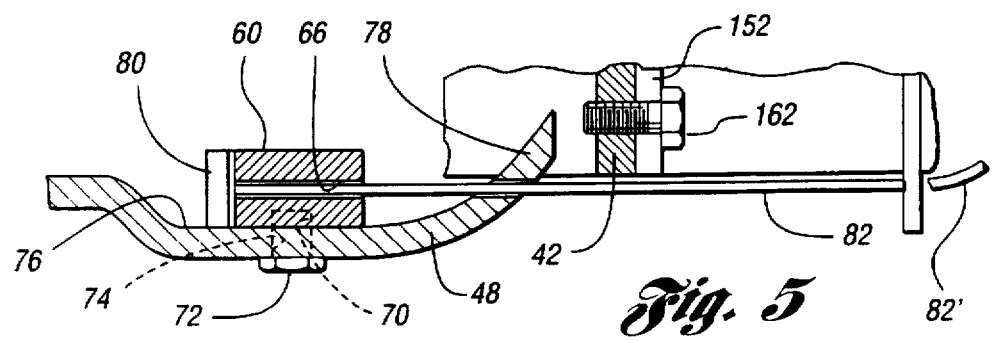

5,701,728

LAWN MOWER WITH LINE TRIMMER ASSEMBLY

TECHNICAL FIELD

This invention relates generally to lawn mowers, and more particularly, to lawn mowers which use filament lines to cut grass or other vegetation.

BACKGROUND OF THE INVENTION

A conventional lawn mower includes a housing supported by four wheels and a motor mounted atop the housing which rotatably drives a blade located beneath the lawn mower housing. When the lawn mower is operated, the blade spins cutting grass located within the housing.

A problem exists in that often not all the grass on a lawn is accessible by the lawn mower. For example, when cutting against a wall, the wheels and housing of the lawn mower may abut the wall with the blade unable to cut the strip of grass between the housing and the wall. Accordingly, a second step of using a line trimmer is necessary to cut the strip of grass by the wall.

The present invention is intended to reduce the amount of a lawn which cannot be cut by a conventional lawn mower and thus must be cut during a second operation using a line trimmer.

SUMMARY OF THE INVENTION

It is an object of the present invention to modify a conventional lawn mower such that the lawn mower can cut vegetation, such as grass, which is located outside the housing of the lawn mower.

It is another object to provide a cutter mechanism mounted on the outside of a lawn mower housing to cut a line filament to a predetermined length.

It is yet another object to provide a lawn mower which has a blade disposed beneath the lower periphery of a lawn mower housing so that a line filament can extend radially outwardly beneath the housing.

The present invention includes a line trimmer assembly, a lawn mower utilizing the line trimmer assembly, and a method of cutting vegetation using a lawn mower employing the line trimmer assembly. The lawn mower comprises a housing, wheels, a motor or engine, and a cutting blade. The housing includes a top wall portion and a generally vertically extending side wall portion. Mounted to the housing are the wheels which allow the lawn mower to roll over a surface to be mowed. The motor or engine rotatably drives a shaft which is coaxial with a longitudinal drive axis and extends through the housing. The elongate blade is attached to rotate with the shaft and has a central portion and a pair of end portions.

At least one line trimmer assembly is attached to the blade. The line trimmer assembly includes a filament line which extends radially to cut vegetation disposed outside of the housing when the elongate blade is rotated.

Preferably, there are two of the line trimmer assemblies attached to the blade. The line trimmer assembly may include a mounting block. The mounting block affixes to the blade and the filament line is releasably held by the mounting block. Further, the line trimmer assembly may include a stop block to which the filament line is attached and which is releasably retained by the mounting block.

A blade mounting block which mounts between the shaft and the central portion of the blade may be used to sufficiently lower the blade beneath the side wall of the housing so that the filament line swings beneath and radially beyond the side wall of the housing.

A cutter mechanism having a knife edge may be mounted to the housing. The filament line is then cut to a predetermined length by the knife edge when the filament line strikes the knife edge.

BRIEF DESCRIPTION OF THE DRAWINGS

These and other features, objects, and advantages of the present invention will become readily apparent from the following description, pending claims, and accompanying sheets of drawings where:

FIG. 3 is a fragmentary perspective view of one of the line trimmer assemblies mounting to an end portion of a lawn mower blade;

FIG. 4 is a fragmentary side elevational view of a blade mounting to an engine shaft using a blade mounting block; and FIG. 5 is a fragmentary side sectional view of a line trimmer assembly having a portion of a filament line being cut by a knife edge of a cutter assembly.

BEST MODE FOR CARRYING OUT THE INVENTION

Figure 1:
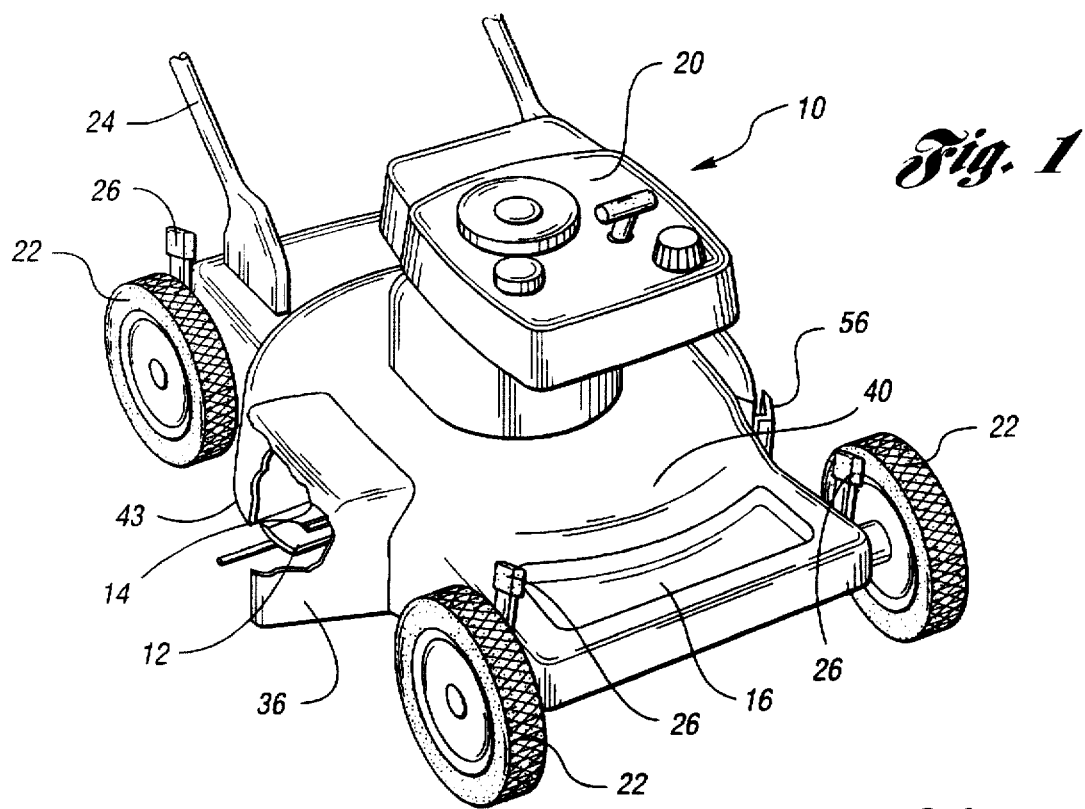
FIG. 1 is a perspective view, partially in cutaway, of a lawn mower using a pair of line trimmer assemblies made in accordance with the present invention.

FIG. 1 shows a lawn mower 10 made in accordance with the present invention. Lawn mower 10 has a blade 12 with a pair of trimmer line assemblies 14 mounted thereon, only one of which is shown in FIG. 1. Lawn mower 10 includes a base or housing 16 which has a power source 20 such as an electric motor or internal combustion engine mounted thereatop. Four wheels 22 are mounted near the corners of housing 16. A user pushes upon a handle 24 to propel and maneuver lawn mower 10. As seen in FIG. 1, each of wheels 22 may be raised and lowered using conventional linkage mechanisms 26.

Figure 2:
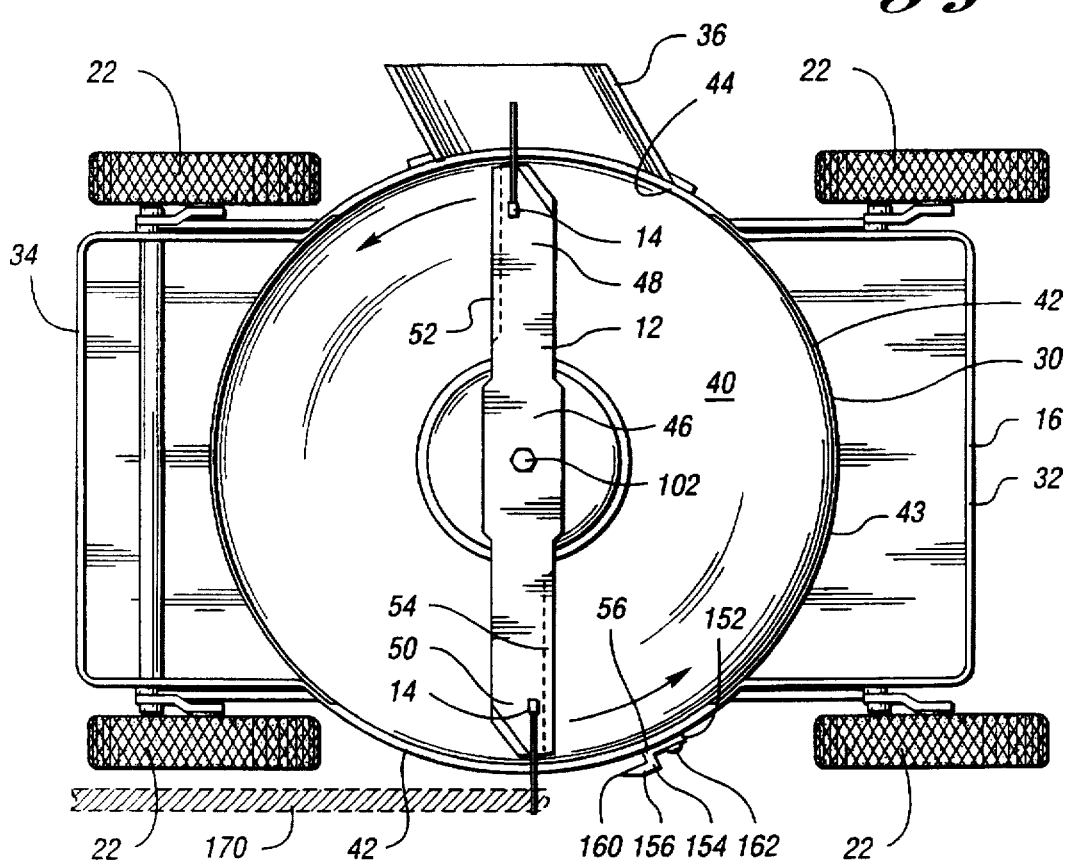
FIG. 2 is a bottom view of the lawn mower of FIG. 1.

Referring now to FIG. 2, the underside of lawn mower 10 is shown. Housing 16 includes a circular deck 30, a forward housing portion 32 and a rear housing portion 34. Mounted on the side of lawn mower 10 is a chute 36. Circular deck 30 includes a top wall 40 and a circular downwardly depending side wall 42 terminating in a generally circularly periphery 43. An opening 44 in side wall 42 provides communication between circular deck 30 and chute 36 such that grass can be expelled through chute 36. Alternatively, lawn mower 10 could be configured to be a conventional rear bagger type lawn mower.

Blade 12 includes a central portion 46 and two radially spaced apart end portions 48 and 50. Along each of end portions 48 and 50 are respective sharpened edges 52 and 54. Trimmer line assemblies 14 are mounted on respective end portions 48 and 50, which are generally similar to each other in configuration. A line cutter assembly 56 is mounted to side wall 42 as shown in FIG. 2.

Referring now to FIG. 3, one of line trimmer assemblies 14 is shown in greater detail. Line trimmer assembly 14 includes a mounting block 60 and a trimmer line unit 62. Mounting block 60 is generally wedge shaped with a vertically extending dovetailed slot 64 formed therein. An aperture 66 extends transversely through mounting block 60. A pair of vertical tapped holes 70 are formed in mounting block 60 which receive bolts 72. Bolts 72 passes through apertures 74 in end portion 48 of blade 12.

As depicted in FIGS. 4–5, line trimmer assembly 14 attaches in a depression 76 formed in blade 12. Also, as seen in FIG. 3, the end of blade 12 has a curved end portion 78 which acts as an airfoil to induce a vacuum effect lifting grass as the grass is cut within housing 18. Further blade 12 has an access slot 80 cut in curved end portion 78.

Trimmer line unit 62 includes a wedge shaped stop block 80 and a filament line 82 extending therefrom. Stop block 80 is slidably and removably received in dovetail slot 64. Preferably, trimmer line unit 62 is integrally molded. To install trimmer line unit 62 in mounting block 60, filament line 82 is threaded through aperture 66 with stop block 80 being slidably and removably received within dovetail slot 64.

Referring to FIG. 4, preferably filament line 82 extends beneath and radially beyond circular periphery 43 of side wall 42. Ideally, filament line 82 extends approximately two inches radially beyond side wall 42. Blade 12 is preferably also below circular periphery 43 of side wall 42. Accordingly, a blade mounting assembly 90 is used to secure blade 12 to an engine shaft 92 to lower the blade from its normal position. Engine shaft 92 is driven by engine or motor 20.

Mounting assembly 90 has an annular mounting block 94 which has a main body 96 and a hub 98. Hub 98 fits over engine shaft 92. Engine shaft 92 is coaxial with a longitudinal axis 93. A key 99 is used to join hub 98 to engine shaft 92 and to prevent relative rotation therebetween. Engine shaft 92 has internal threads 100. A bolt 102 passes through an aperture 104 in blade 12 and an aperture 106 in mounting block 94 and is received within internal threads 100 of engine shaft 92.

A plurality of annular spacers 110 may be placed within hub 98 resulting in blade 12 being spaced apart or lowered relative to engine shaft 92 and housing 18. Radially outward from hub 98 are a pair of apertures 112 and 114. A pair of bolts 116 and 120 pass through apertures 122 and 124 in blade 12 and apertures 112 and 114 in mounting block 94. Bolts 116 and 120 are threadedly received within nuts 126 and 130 which clamp lock washers 132 and 134 against mounting block 94. Again, by varying the number of spacers 110 located within hub 98, the height of blade 12 relative to engine shaft 92 and housing 18 can be vertically adjusted.

FIGS. 2 and 5 show Z-shaped cutter mechanism 56. Cutter mechanism 56 includes a mounting plate 152, an intermediate plate 154 and a terminal plate 156. Terminal plate 156 has a knife edge 160 sharpened thereon. A threaded fastener 162 affixes cutter mechanism 56 to side wall 42. After trimmer line unit 62 is installed within mounting block 60, blade 12 is rotated at a high speed. Filament line 82 will then strike knife edge 160 of cutter mechanism 56 and will chop off any excess length of filament line 82', as illustrated in FIG. 5.

As depicted in FIG. 2, as lawn mower 10 passes adjacent a wall 170, such as a brick wall, a portion of filament line 82 will extend radially beyond side wall 42. Consequently, any grass or vegetation located between side wall 42 and wall 170 will be cut by rotating line filament 82.

While in the foregoing specification this invention has been described in relation to a certain preferred embodiment thereof, and many details have been set forth for the purpose of illustration, it will be apparent to those skilled in the art that the invention is susceptible to alteration and that certain other details described herein can vary considerably without departing from the basic principles of the invention.

For example, the housing within which a blade rotates could be rectangular or square. Then elongate circumferentially extending slots could be formed in the side walls of the housing where necessary to allow the line filament to extend outside of the housing. The line filament would then swing within that portion of the housing which is located radially beyond the rotating filament line. Accordingly, only thin slots would be needed and the blade would not have to be lowered to allow the filament line to pass beneath the housing.

Further, rather than using a conventional line filament, it is possible to use a relatively stiff molded plastic blade which either attaches to the end of a conventional metal blade or else actually replaces a conventional metal blade completely. In either case, the end of the plastic blade would extend radially outside the housing to allow grass to be cut outside the housing and beyond the track of the lawn mower wheels.

Also, blade 12 could mate with an integral mounting mechanism which retains a filament line. Although more complex, it is also possible to use an automotive filament line feedout. All of these variations are deemed within the scope of the present invention which uses a line filament or the like to cut vegetation outside the housing of a lawn mower.

What is claimed is:

1. A lawn mower for cutting vegetation, the lawn mower comprising:

a housing including a top wall portion and a generally vertically extending side wall portion;

wheels attached to the housing to allow the lawn mower to roll over a surface to be mowed;

a power source mounted on the housing which rotatably drives a shaft extending through the housing and coaxial with a longitudinal drive axis;

an elongate blade attached to rotate with the shaft and having a central portion and a pair of end portions, at least one of the end portions having a cutting edge thereon for cutting vegetation disposed inside of the housing to a first length upon rotation of the blade; and at least one line trimmer assembly attached to the blade, the line trimmer assembly including a filament line which extends radially beyond the side wall portion to cut vegetation disposed outside of the housing to a second length upon rotation of the blade, said second length being greater than said first length.

2. The lawn mower of claim 1 wherein:

the at least one line trimmer assembly includes a pair of line trimmer assemblies, each line trimmer assembly attaching to a respective end portion of the blade.

3. The lawn mower of claim 1 wherein:

the at least one line trimmer assembly includes a mounting block, the mounting block affixing to the blade and the filament line being releasably held by the mounting block.

4. The lawn mower of claim 3 wherein:

the line trimmer assembly includes an enlarged stop block to which the filament line is attached.

5. The lawn mower of claim 4 wherein:

the stop block and the filament line are integrally molded together.

6. The lawn mower of claim 4 wherein:

the mounting block has a slot formed therein and the stop block is releasably retained in the slot.

7. The lawn mower of claim 6 wherein:

the mounting block has an aperture therein; and the filament line is threaded through the aperture in the mounting block.

8. The lawn mower of claim 1 further comprising:

a blade mounting block which mounts between the shaft and the central portion of the blade to sufficiently lower the blade beneath the side wall of the housing with the filament line swinging beneath and radially beyond the side wall of the housing.

9. The lawn mower of claim 1 further comprising:

a cutter mechanism having a knife edge which mounts relative to the housing, the filament line being cut to a predetermined length by the knife edge when the filament line strikes the knife edge.

10. A line trimmer assembly for use with a lawn mower having a housing with a peripheral extending side wall, a power source mounted on the housing, and a blade rotatably driven by the power source about a vertical axis, wherein the blade includes a cutting edge which cuts vegetation to a first length, the line trimmer assembly comprising:

a mounting block affixable to the blade; and a filament line retained by the mounting block;

wherein, when the mounting block is attached to the blade, the filament line extends radially beyond the side wall of the housing to cut vegetation located outside of the housing to a second length when the lawn mower blade is rotated, said second length being greater than said first length.

11. The line trimmer assembly of claim 10 wherein:

the mounting block has an aperture through which the filament line is mounted.

12. The liner trimmer assembly of claim 10 wherein:

the filament line has a stop block attached thereto, the stop block being releasably retained by the mounting block.

13. A method for cutting vegetation on a surface, the method comprising:

providing a lawn mower having a housing with a peripherally extending side wall, wheels attached to the housing, a power source mounted on the housing, and a cutting blade rotatably driven by the power source to cut vegetation to a first length upon rotation of the blade;

mounting a line trimmer assembly to the blade, the line trimmer assembly including an elongate filament line, the filament line extending radially beyond the side wall of the housing to cut vegetation to a second length upon rotation of the blade, said second length being greater than said first length; and rotating the blade such that the blade cuts vegetation located inside of the housing to said first length and the filament line cuts vegetation located outside the housing to said second length.

* * * * *